US011428583B2

(12) United States Patent
Wang et al.

(10) Patent No.: US 11,428,583 B2
(45) Date of Patent: Aug. 30, 2022

(54) TEMPERATURE SENSOR BASED ON DIFFERENT WIRE TEMPERATURE COEFFICIENT OF RESISTANCE (TCR)

(71) Applicant: Taiwan Semiconductor Manufacturing Co., Ltd., Hsinchu (TW)

(72) Inventors: Lorraine Wang, Hsinchu (TW); Shih-Lien Linus Lu, Hsinchu (TW)

(73) Assignee: Taiwan Semiconductor Manufacturing Co., Ltd.

( * ) Notice: Subject to any disclaimer, the term of this patent is extended or adjusted under 35 U.S.C. 154(b) by 381 days.

(21) Appl. No.: 16/549,636

(22) Filed: Aug. 23, 2019

(65) Prior Publication Data

US 2021/0055166 A1 Feb. 25, 2021

(51) Int. Cl.
*G01K 7/00* (2006.01)
*G01K 3/00* (2006.01)
*G01K 7/02* (2021.01)
*G01K 7/18* (2006.01)

(52) U.S. Cl.
CPC ............. *G01K 3/005* (2013.01); *G01K 7/021* (2013.01); *G01K 7/183* (2013.01)

(58) Field of Classification Search
CPC combination set(s) only.
See application file for complete search history.

(56) References Cited

U.S. PATENT DOCUMENTS

2013/0168815 A1* 7/2013 Le Neel .................. G01K 7/20 257/536
2014/0376595 A1* 12/2014 Daley .................... H01L 28/20 374/185
2016/0181239 A1* 6/2016 Deng ................. H01L 21/7684 257/536
2018/0149527 A1* 5/2018 Lu ........................... G01K 7/01
2019/0094080 A1 3/2019 Lu
2019/0120700 A1 4/2019 Lu et al.

* cited by examiner

*Primary Examiner* — Lisa M Caputo
*Assistant Examiner* — Nasir U. Ahmed
(74) *Attorney, Agent, or Firm* — Sterne, Kessler, Goldstein & Fox P.L.L.C.

(57) ABSTRACT

A temperature sensor is disclosed that determines whether the temperature of an integrated circuit (IC) is within a normal temperature range. A low threshold monitor circuit senses whether the temperature of the IC is above or below a minimum temperature threshold. A high threshold monitor circuit configured senses whether the temperature of an integrated circuit (IC) is above or below a maximum temperature threshold. The minimum temperature threshold is determined by an intersection of a first temperature coefficient of resistance (TCR) and a second TCR that are associated with a first pair of conductive lines. The maximum temperature threshold is determined by an intersection of a third TCR and a fourth TCR associated that are with the second pair of conductive lines.

20 Claims, 6 Drawing Sheets

| | IN 212 | IN 214 | OUT 107 |
|---|---|---|---|
| Temp < T_min | 0 | 1 | 0 |
| T_min < Temp < T_max | 1 | 1 | 1 |
| T_max < Temp | 1 | 0 | 0 |

| | CLK 302 | IN 212 | IN 214 | OUT 107 |
|---|---|---|---|---|
| Temp < T_min | 1 | 0 | 1 | 0 |
| T_min < Temp < T_max | 1 | 1 | 1 | 1 |
| T_max < Temp | 1 | 1 | 0 | 0 |

| | CLK 302 | IN 212 | IN 214 | OUT 107 |
|---|---|---|---|---|
| Temp < T_min | 0 | 0 | 1 | 0 |
| T_min < Temp < T_max | 0 | 1 | 1 | 0 |
| T_max < Temp | 0 | 1 | 0 | 0 |

TEMPERATURE SENSOR BASED ON DIFFERENT WIRE TEMPERATURE COEFFICIENT OF RESISTANCE (TCR)

BACKGROUND

Technology scaling for high performance integrated circuits has resulted in higher current densities in interconnection lines and devices, which in turn increases power dissipation. Generally, a significant amount of such dissipated power converts to heat, which thus causes a substantial rise in heat density. Respective different operation modes of each of the functional blocks in a high performance integrated circuit cause temperature gradients on a respective substrate where the integrated circuit is formed. The above-mentioned scenarios lead to a need for a lightweight, robust, and power-efficient on-chip temperature-sensing device that can be used for accurate thermal management.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
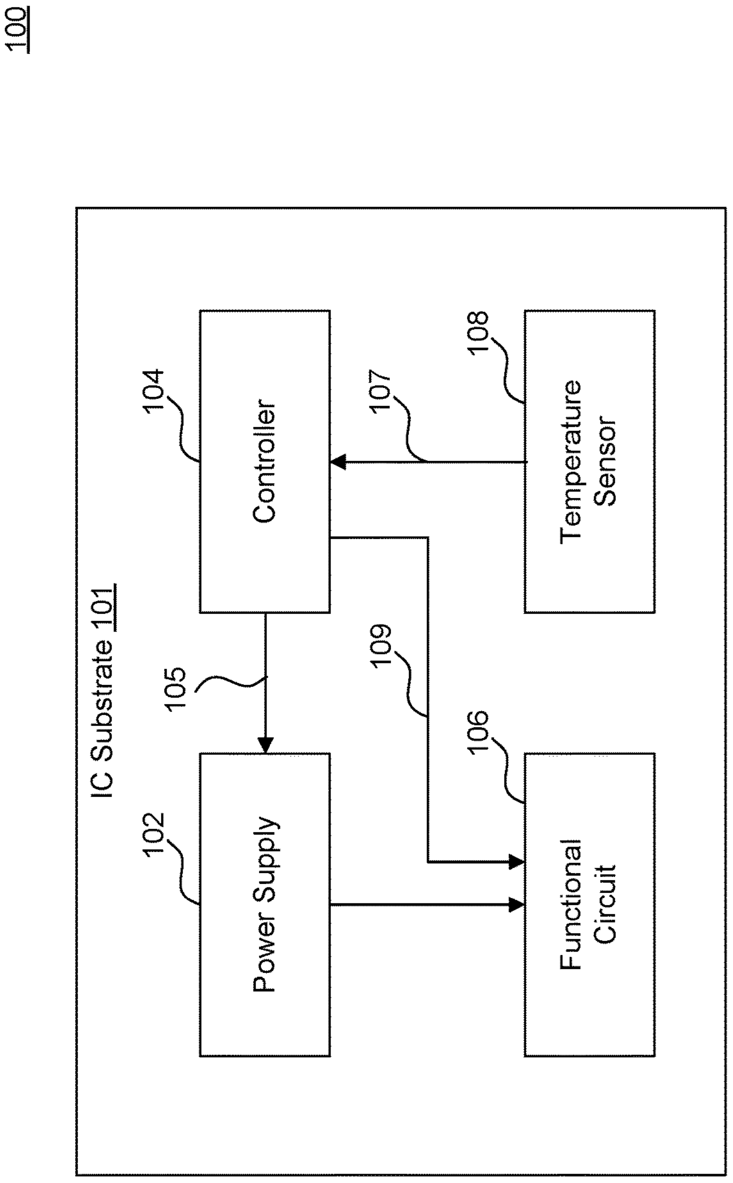
FIG. 1 illustrates an integrated circuit according to an exemplary embodiment of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is does not in itself dictate a relationship between the various embodiments and/or configurations discussed.

Overview

A temperature sensor is provided that determines whether the temperature of an IC is within a normal temperature range. The temperature sensor includes a low threshold monitor circuit and a high threshold monitor circuit. The low threshold monitor circuit senses whether the temperature of the IC is above or below a minimum temperature threshold. The high threshold monitor circuit senses whether the temperature of an integrated circuit (IC) is above or below a maximum temperature threshold. The low threshold monitor circuit includes a first pair of conductive lines, each having a different temperature coefficient of resistance (TCR) from the other; where the minimum temperature threshold is determined by an intersection of a first TCR and a second TCR that are associated with the first pair of conductive lines. The high threshold monitor circuit includes a second pair of conductive lines, each having a different TCR from the other and also different from that of the first pair of conductive lines; where the maximum temperature threshold is determined by an intersection of a third TCR and a fourth TCR that are associated with the second pair of conductive lines.

FIG. 1 illustrates an example integrated circuit (IC) 100 according to embodiments of the present disclosure. IC 100 can be used in any number electronic products and devices that utilize ICs including computers, consumer electronics, transportation equipment, communication equipment, among others. IC 100 includes a power supply 102, a controller 104, functional circuit(s) 106, and a temperature sensor 108, which are all disposed on a common semiconductor substrate 101. For example, the substrate 101 can be a complementary metal oxide semiconductor (CMOS) substrate or other type of semiconductor substrate as will be understood by those skilled in the art.

During operation, power supply 102 provides voltage and/or current to the functional circuit(s) 106 that perform the intended circuit functionality of the IC 100. Temperature sensor 108 is disposed on the same common substrate 101 (e.g. on-chip) as the functional circuit(s) 106 and therefore will experience the same or similar temperature gradient as that of the functional circuit(s) 106 and other elements of IC 100. Temperature sensor 108 senses whether the temperature of IC 100 is operating within a predefined normal temperature range and generates an output signal 107 representative thereof, which is sent the controller 104. Herein, the normal temperature range is greater than a minimum temperature threshold and less a maximum temperature threshold, wherein the minimum and maximum thresholds can be predefined, for example, based on operator or manufacturer specifications. The temperature sensor 108 generates the output signal 107 to have a first logic state (e.g., logic high) when the IC 100 is operating within the normal temperature range, and a second logic state (e.g. logic low) when the IC 100 is operating outside the normal temperature range. Once skilled in the art will recognize that that logic states could be reversed.

Controller 104 receives the output signal 107 from the temperature sensor 108 and can control the operating status of the power supply 102 and/or the functional circuit(s) 106 based on whether the IC 100 is indicated to be operating within the normal temperature range. For example, the controller 104 can command the power supply 102 using control signal 105 to reduce the supply voltage or current to reduce the temperature of IC 100 when the IC 100 is exceeding the maximum temperature threshold. Likewise, the controller 104 can command the power supply to increase the operating voltage or current to increase the temperature of IC 100 when the IC 100 is below the minimum temperature threshold. Further, the controller 104 can command the functional circuit(s) 106 to increase or decrease its processing speed using control signal 109 to further mitigate any abnormal temperature that is determined of the IC 100. Further, the controller 104 can command the functional circuit(s) 106 to disable any signal output or data output using the control signal 109 when an abnormal temperature is detected because the signal output or data output may not be valid when the IC 100 is operating outside the normal temperature range.

Figures 2A, 2B:
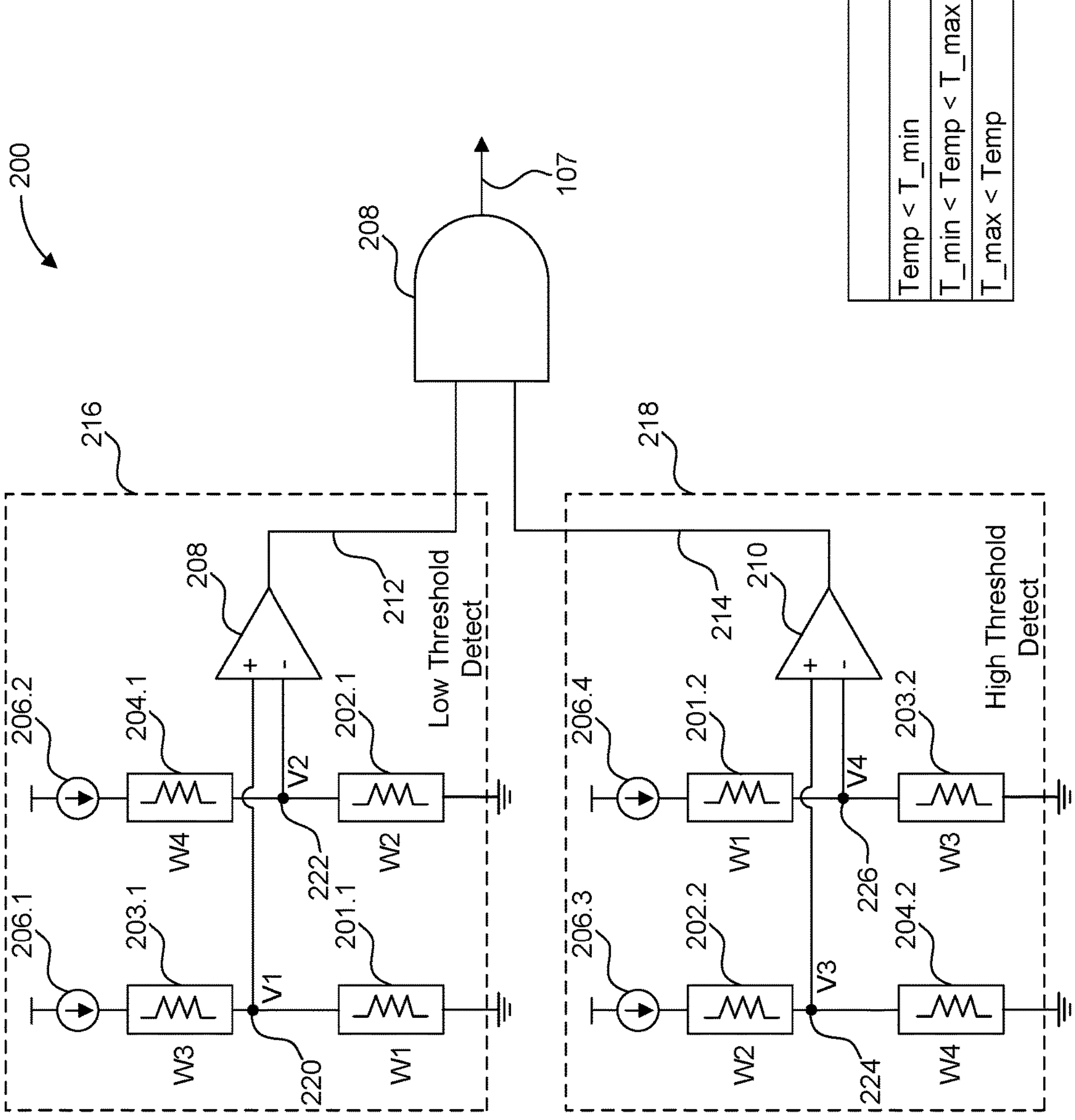
FIGS. 2A-2C illustrate a temperature sensor according to an exemplary embodiment of the present disclosure.

FIG. 2A illustrates a temperature sensor 200 according to embodiments of the disclosure, and is one embodiment of the temperature sensor 108 that is shown in FIG. 1. Temperature sensor 200 includes a low threshold monitor circuit 216, a high threshold monitor circuit 218, and a logic gate 208. Logic gate 208 is illustrated as an "AND" gate, however, one skilled in the art will recognize that other types of logic gates could be used based on the disclosure provided herein.

As will be described in detail below, low threshold monitor circuit 216 senses whether the temperature of the IC 100 is above or below the minimum temperature threshold and generates a logic signal 212 indicative thereof. For example, the logic signal 212 can be a logic high (e.g., "1") when the temperature is above the minimum temperature threshold, and a logic low (e.g., "0") when the temperature is below the minimum temperature threshold. Likewise, high threshold monitor circuit 218 senses whether the temperature increases above or below the maximum temperature threshold and generates a logic signal 214 indicative thereof. For example, the logic signal 214 can be a logic high (e.g., "1") when the temperature is below the maximum temperature threshold, and a logic low (e.g., "0") when the temperature is above the maximum temperature threshold.

Logic gate 208 determines whether the temperature of the IC 100 is within a normal temperature range based on the logic signals 212 and 214, and generates the output signal 107 indicative thereof. FIG. 2B illustrates a "truth table" that describes the operation of logic gate 208 based on the various input combinations. Referring to FIG. 2B, when both logic signals 212 and 214 are at a logic high, the logic gate 208 generates output signal 107 that is a logic high indicative of the temperature of the IC 100 being within the normal temperature range. When either one of logic signal 212 or 214 is a logic low, either the minimum temperature threshold or the maximum temperature threshold has been violated, so the logic gate 208 generates output signal 107 that is a logic low indicative of the IC 100 operating at an abnormal temperature. As discussed above, the controller 104 receives and evaluates the output signal 107, and can generate control signals 105 and 109 to mitigate a determination that the IC 100 is operating at an abnormal temperature as described above with reference to FIG. 1.

As discussed above, low threshold monitor circuit 216 senses whether the temperature of the IC 100 is above or below the minimum temperature threshold, and generates a logic signal 212 indicative thereof. Low threshold monitor circuit 216 includes constant current sources 206.1-206.2 and conductive lines 201.1, 202.1, 203.1, 204.1, where each conductive line can be a metal trace deposited on the semiconductor substrate 101. Conductive lines 201.1 and 202.1 provide a first pair of conductive lines that are fabricated to each have a different temperature coefficient of resistance (TCR) from the other. As will be understood by those skilled in the art, TCR depicts the variation of resistance over temperature for a particular conductor line. Further, as will be understood by those skilled in art, differing TCRs can be achieved by fabricating the conductive lines 201.1 and 202.1 to have different cross-sectional widths (herein "widths").

Figure 2C:
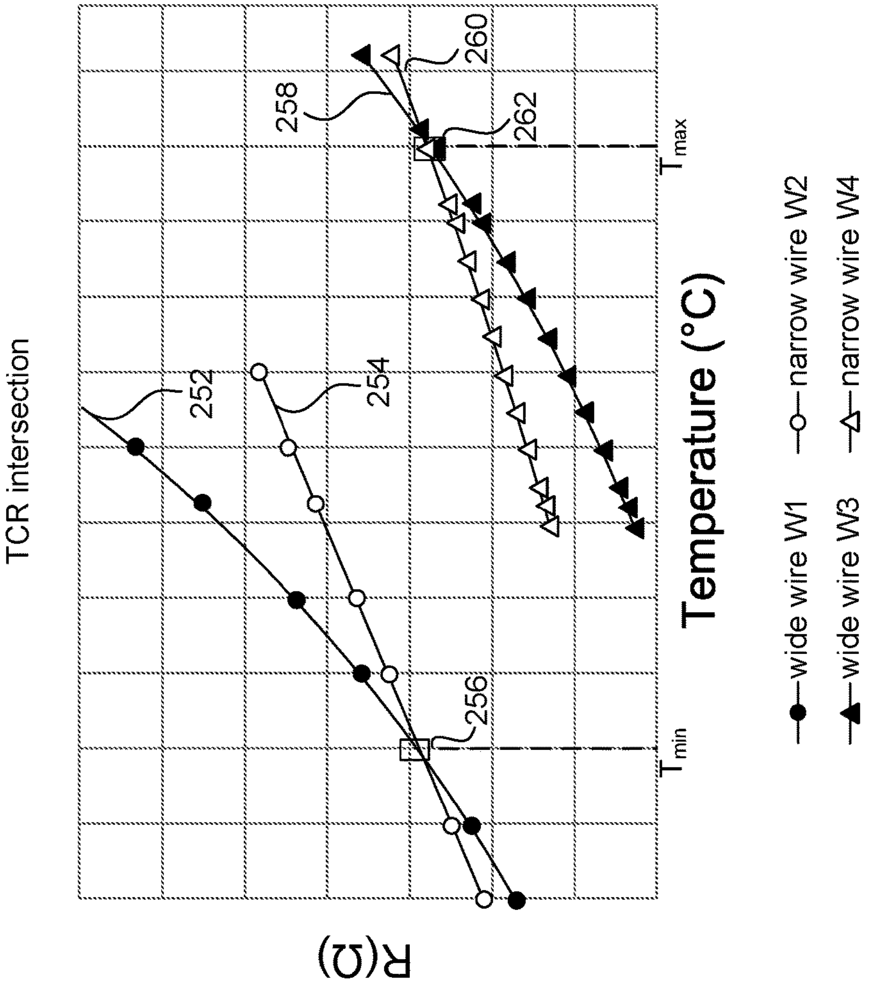

The structure and operation of low threshold monitor circuit 216 will now be discussed with reference to FIG. 2C, which illustrates the TCRs for various conductor line widths associated with conductive lines 201.1, 202.1, 203.1, 204.1. Namely, conductive line 201.1 has a first width W1 and a corresponding TCR 252. Whereas, conductive line 202.1 has a second width W2 that is narrower than that of first width W1, resulting in a corresponding TCR 254. It is noted that the TCR 252 associated with wider width W1 is more sensitive to temperature than that of TCR 254 associated with the narrower width W2. Accordingly, the resistance associated with TCR 252 increases at a faster rate with temperature than that of TCR 254, resulting in an intersection 256 between the TCR 252 and TCR 254 at a particular temperature that defines the minimum temperature threshold (Tmin) for the normal temperature range discussed above. Likewise, conductive lines 203.1 and 204.1 provide a second pair of conductive lines that are fabricated to each have a different TCR from the other. Still referring to FIG. 2C, conductive line 203.1 has a third width W3 and a corresponding TCR 258. Whereas conductive line 204.1 has a fourth width W4 that is narrower than that of third width W3, and resulting in a corresponding TCR 260. It is noted that the TCR 258 associated with wider width W3 is more sensitive to temperature than that of TCR 260 associated with the narrower width W4. Accordingly, the resistance associated with TCR 258 increases at a faster rate with temperature than that of TCR 260, resulting in an intersection 262 between the TCR 258 and TCR 260 at a particular temperature that defines the maximum temperature threshold (Tmax) for the normal temperature discussed above.

During operation, conductive lines 203.1 and 201.1 are driven by constant current source 206.1 and operate to provide a first voltage divider to generate a voltage V1 at node 220 formed at the physical junction of the conductive lines 203.1 and 201.1. Likewise, conductive lines 204.1 and 202.1 are driven by current source 206.2 and operate to provide second voltage divider to generate a voltage V2 at node 222 formed at the physical junction of the conductive lines 204.1 and 202.1. As such, V1 measures the voltage drop across conductive line 201.1 (to ground), and V2 measures the voltage drop across conductive line 202.1 (to ground). The voltages V1 and V2 are influenced by the differing TCRs of the respective conductive lines because the corresponding resistances of the conductive lines change with temperature as shown in FIG. 2C. For instance, based on the respective TCRs, the resistance of first conductor 201.1 (associated with TCR 252) will be higher than that of the second conductor 202.1 (associated with TCR 254) for any given temperature above Tmin. However, below Tmin, the resistance of first conductor 201.1 (associated with TCR 252) will be lower than that of the second conductor 202.1 (associated with TCR 254) for any given temperature below Tmin. Therefore, assuming that the current sources 206.1 and 206.2 are of equal magnitude, V1 will be greater than V2 for any given temperature above Tmin, and therefore the measurement of V1−V2 can be used to indicate whether the temperature is above Tmin. Accordingly, the operational amplifier 208, having a differential input coupled to nodes 220 and 222, operates as comparator to measure the voltage difference (V1−V2). Specifically, the operational amplifier 208 outputs logic signal 212 as logic high to indicate V1 is greater than V2, thereby indicating the temperature of IC 100 is above Tmin, and hence not abnormal. Whereas, the operational amplifier 208 outputs logic signal 212 as logic low to indicate V1 is less than V2, thereby indicating the temperature of IC 100 is below Tmin, and therefore outside the normal temperature range.

The structure and operation of high threshold monitor circuit 218 will now be discussed with reference to FIG. 2C. As discussed above, high threshold monitor circuit 218 senses whether the temperature of the IC 100 is above or below the maximum temperature threshold and generates a logic signal 214 indicative thereof. High threshold monitor circuit 218 includes conductive lines 201.2, 202.2, 203.2, 204.2, where each conductive line can be a metal trace deposited on the semiconductor substrate 101. The conductive lines 201.2, 202.2, 203.2, 204.2 have respective widths that are the same, or substantially the same as, those of respective conductive lines 201.1, 202.1, 203.1, 204.1 so that: conductive line 201.2 has the same width W1 and corresponding TCR 252, as conductive line 201.1; conductive line 202.2 has the same width W2 and corresponding TCR 254, as conductive line 202.1; conductive line 203.2 has the same width W3 and corresponding TCR 258, as conductive line 203.1; and conductive line 204.2 has the same width W4 and corresponding TCR 260, as conductive line 204.1. Accordingly, conductive lines 201.2 and 202.2 provide a third pair of conductive lines that are fabricated to each have a different TCR from the other. Likewise, conductive lines 203.2 and 204.2 provide a fourth pair of conductive lines that are fabricated to each have a different TCR from the other. Compared with low threshold monitor circuit 216, it is noted that conductive lines 203.2 (width W3) and 204.2 (width W4) are coupled between the respective internal nodes 224, 226 and ground. Whereas, for low threshold monitor circuit 216, conductive lines 201.1 (width W1) and 202.1 (width W2) are coupled between the respective internal nodes 220, 222 and ground.

During operation, conductive lines 202.2 and 204.2 are driven by constant current source 206.3 and operate to provide a third voltage divider to generate a voltage V3 at node 224 formed at the physical junction of the conductive lines 202.2 and 204.2. Likewise, conductive lines 201.2 and 203.2 are driven by constant current source 206.4 and operate to provide a fourth voltage divider to generate a voltage V4 at node 226 formed at the physical junction of the conductive lines 201.2 and 203.2. As such, V3 measures the voltage drop across conductive line 204.2 and ground, and V3 measures the voltage drop across conductive line 203.2 and ground. The voltages V3 and V4 are influenced by the differing TCRs of the respective conductive lines because the corresponding resistances of the conductive lines change with temperature as shown in FIG. 2C. For instance, based on the respective TCRs, the resistance of fourth conductor 204.2 (associated with TCR 260) will be higher than that of the third conductor 203.2 (associated with TCR 258) for any given temperature below Tmax. However, above Tmax, the resistance of fourth conductor 204.2 (associated with TCR 260) will be lower than that of the third conductor 203.2 (associated with TCR 258) for any given temperature above Tmax. Therefore, assuming that the current sources 206.3 and 206.4 are of equal magnitude, V3 will be greater than V4 for any given temperature below Tmax, and therefore the measurement of V3–V4 can be used to indicate whether the temperature is below Tmax. Accordingly, the operational amplifier 210, having a differential input coupled to nodes 224 and 226, operates as comparator to measure the voltage difference (V3–V4). Specifically, the operational amplifier 210 outputs logic signal 214 as logic high when V3 is greater than V4, thereby indicating the temperature of IC 100 is below Tmax, and hence not abnormal. Whereas, the operational amplifier 210 outputs logic signal 214 as logic low when V3 is less than V4, thereby indicating the temperature of IC 100 is above Tmax, and therefore outside the normal temperature range.

Figures 3A, 3B, 3C:
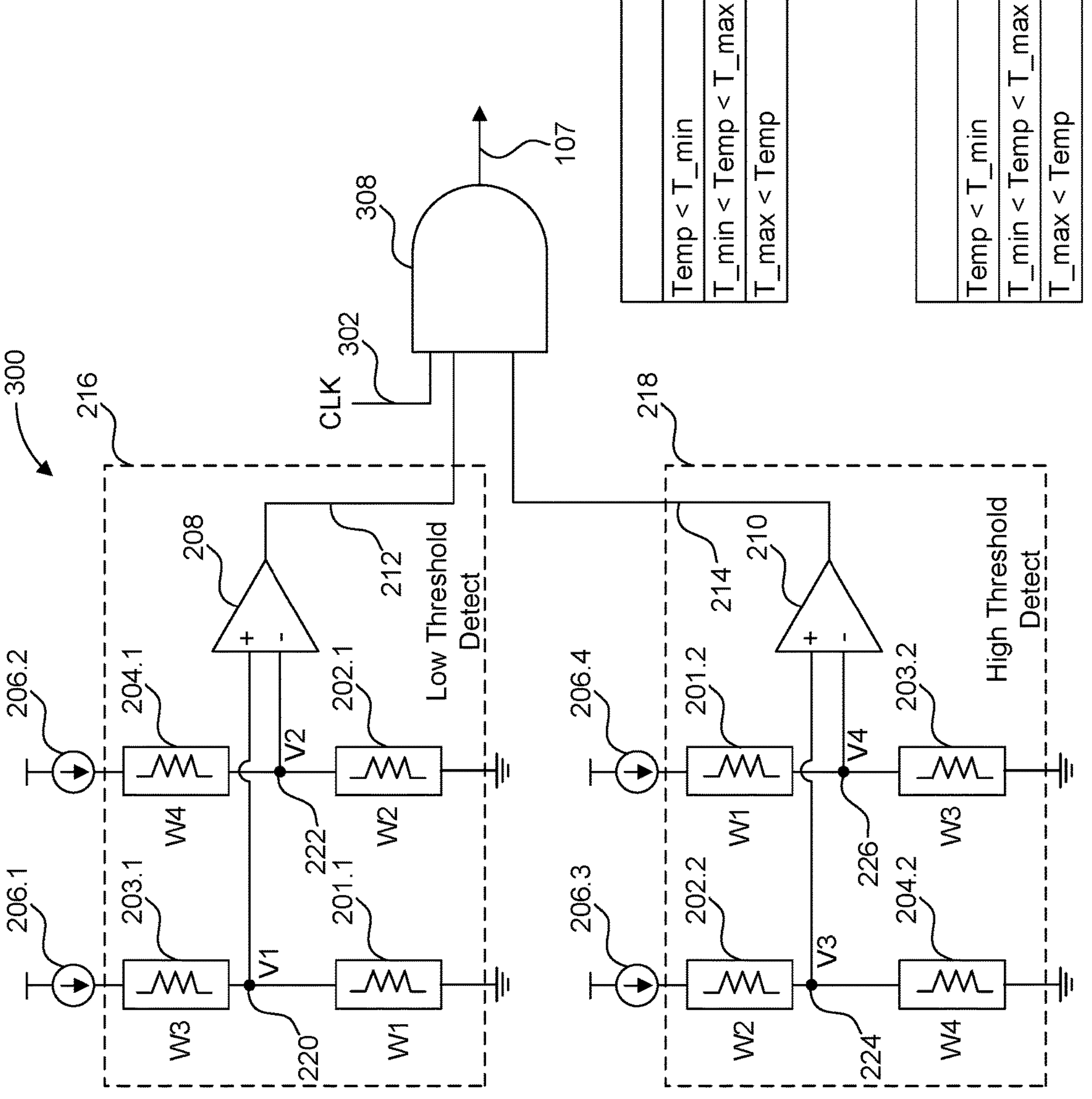
FIGS. 3A-3C illustrate a temperature sensor according to another exemplary embodiment of the present disclosure.

FIG. 3A illustrates a temperature sensor 300 according to embodiments of the disclosure, and is a second embodiment of the temperature sensor 108 that is shown in FIG. 1. Temperature sensor 300 is substantially similar to temperature sensor 200, and therefore only the differences between temperature sensor 200 and temperature sensor 300 will be discussed. Namely, temperature sensor 300 includes a logic gate 308 instead of logic gate 208, wherein logic gate 308 includes a clock input 302 in addition to the logic signals 212 and 214. Logic gate 308 is illustrated as an "AND" gate, however, one skilled in the art will recognize that other types of logic gates could be used based on the disclosure provided herein.

Logic gate 308 determines whether the temperature of the IC 100 is within normal operating range based on the logic signals 212, 214, and clock signal 302 to generate the output signal 107 indicative thereof. Logic gate 308 operates similar to logic gate 208, except that the additional clock signal 302 provides a gating function on the output signal 107 as discussed below. FIGS. 3B-3C illustrates a "truth table" that describes the operation of logic gate 808 based on the various input combinations. Referring to FIG. 3B, when both logic signals 212 and 214 are at a logic high and the clock signal 302 is at a logic high, the logic gate 308 generates output signal 107 that is a logic high indicative of the temperature of the IC 100 being within the normal operating range. When either one of logic signal 212 or 214 is a logic low, either the minimum temperature threshold or the maximum temperature threshold has been violated, so the logic gate 308 generates output signal 107 that is a logic low indicative of the IC 100 operating at an abnormal temperature. Referring to FIG. 3C, when the clock signal 302 is at a logic low, then the output signal 107 is a logic low, regardless of the state of the logic signals 212 or 214. Accordingly, the addition of the clock signal 302 provides a gating function on the output signal 107, so that a logic high will only occur during positive clock cycles of clock signal 302, in addition to the requirements on the logic signal 212, 214 discussed above. The controller 104 receives and evaluates the output signal 107, and can generate control signals 105 and 109 to mitigate a determination of the IC 100 operating at an abnormal temperature as described above with reference to FIG. 1.

Figure 4:
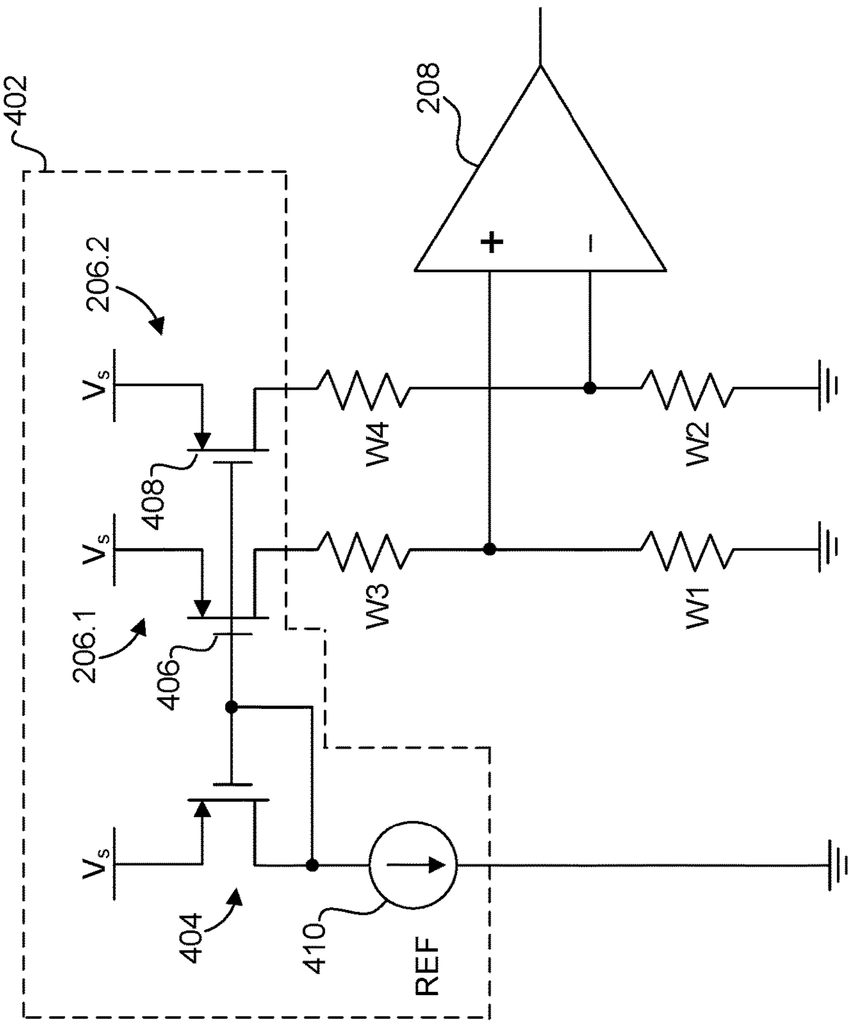
FIG. 4 illustrates a current mirror according to an exemplary embodiment of the disclosure.

FIG. 4 illustrates a current mirror 402, which is one embodiment for implementing the constant current sources 206.1 and 206.2 according to embodiments of the disclosure. Current mirror 402 includes reference transistor 404, mirror transistors 406, 408, and reference current source 410 arranged in a current mirror configuration. Mirror transistors 406 and 408 respectively provide the constant current sources 206.1 and 206.2. During operation, reference current source 410 defines a reference current that necessarily flows through reference transistor 404. The gates of the reference transistor 404 and the mirror transistors 406, 408 are tied together so that all the transistors 404-408 have a common gate voltage, and the respective sources are all coupled voltage supply Vs. Accordingly, the respective gate to source voltages of the mirror transistors 406, 408 are necessarily the same, or similar, to that of the reference transistor 404. As such, the respective currents provided by transistors 406, 408 are determined by the common gate to source voltage so that the respective currents provided by transistors 406 and 408 are the same as the reference current provided by reference current source 410, assuming the transistors 404, 406, and 408 have a same size. Alternatively, the mirror transistors 406 and 408 can be scaled in size relative to the reference transistor 410, in order to proportionally scale the current provided by the respective mirror transistors 406 and 408 as will be understood by those skilled in the art. Further, the constant current sources 206.3 and 206.4 can be implemented using a similar construct, as will be understood by those skilled in art.

Figure 5:
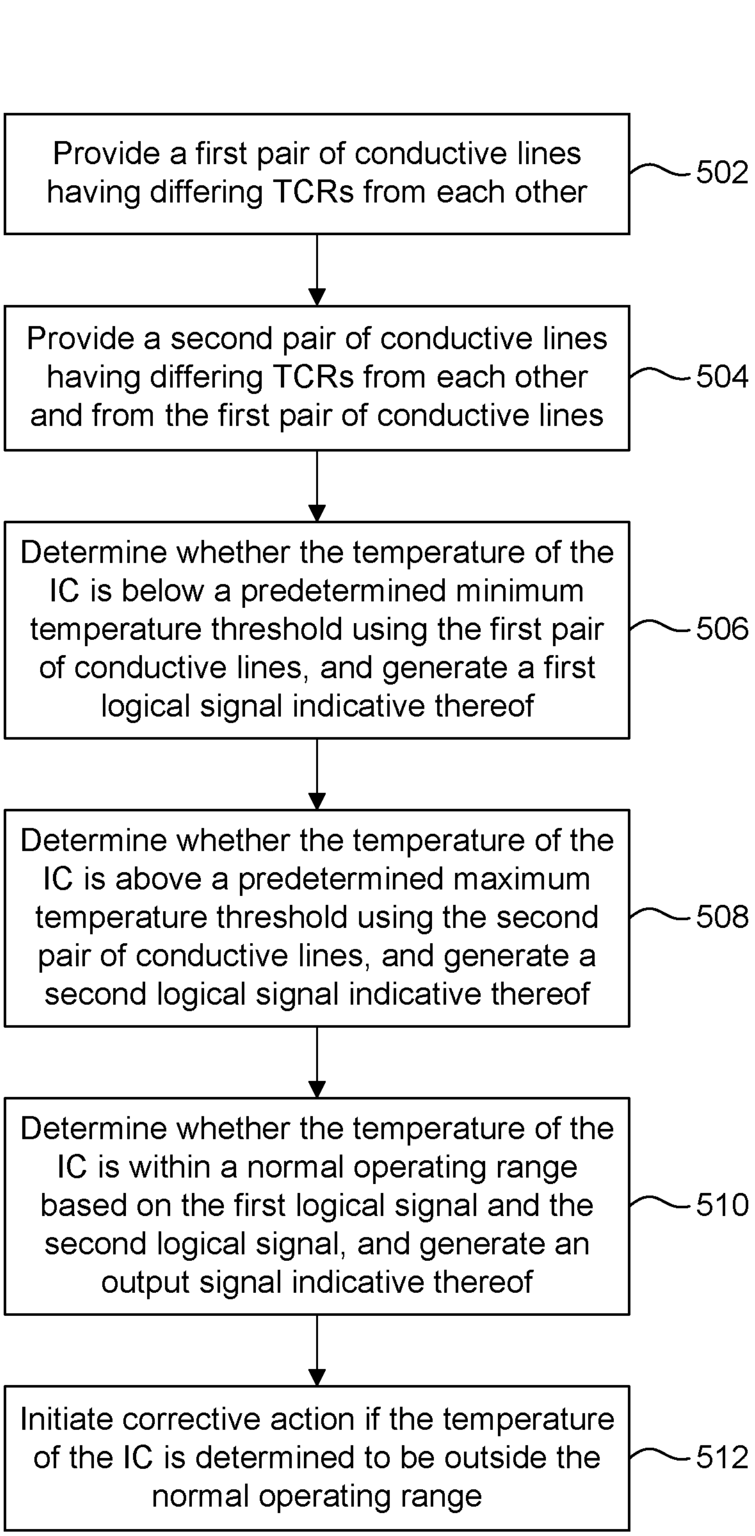
FIG. 5 illustrates a flowchart of an exemplary operation for determining whether the temperature of an IC is within a normal temperature range according to another exemplary embodiment of the present disclosure.

FIG. 5 illustrates a flowchart 500 of an exemplary operation for determining whether the temperature of an IC (e.g., IC 100) is operating within a normal temperature range according to embodiments of the present disclosure. The flowchart 500 makes reference to the temperature sensor 200 in FIG. 2A and IC 100 in FIG. 1 for example purposes only. The disclosure is not limited to this operational description or its application to temperature sensor 200 or the IC 100. Rather, it will be apparent to persons of ordinary skill in the relevant art(s) that other operational control flows, systems, and applications are within the scope and spirit of the present disclosure.

At operation 502, a first pair of conductive lines is provided, where the first pair of conductive lines have a different TCR from each other. For example, referring to FIG. 2A, conductive lines 201.1 and 202.1 provide a first pair of conductive lines that are fabricated to each have a different TCR from the other, as is illustrated by respective TCRs 252,254 that are shown in FIG. 2C.

At operation 504, a second pair of conductive lines is provided, where the second pair of conductive lines have a different TCR from each other, and also different from the first pair of conductive lines. For example, referring to FIG. 2A, conductive lines 204.2 and 203.2 provide a second pair of conductive lines that are fabricated to each have a different TCR from the other, as is illustrated by respective TCRs 258,260 that are shown in FIG. 2C. The TCRs 258,260 are also different from the TCRs 252,254 of the first pair of conductive lines as shown in FIG. 2C.

At operation 506, a determination is made whether the temperature of the IC is above or below a minimum temperature threshold using the first pair of conductive lines, and a first logical signal is generated indicative thereof. For example, referring to FIG. 2A, current sources 206.1 and 206.2 drive the first pair of conductive lines 201.1 and 202.1, each arranged in voltage divider configuration, to generate voltages V1,V2 at connecting nodes 220,221. Further, low threshold monitor circuit 216 senses whether the temperature of the IC 100 is above or below the minimum temperature threshold based the voltage difference (V1−V2) and generates a logic signal 212 indicative thereof. For example, the logic signal 212 can be a logic high (e.g., "1") when the temperature is above minimum temperature threshold, and a logic low (e.g., "0") when the temperature is below the minimum temperature threshold.

At operation 508, a determination is made whether the temperature of the IC is above or below a maximum temperature threshold using the second pair of conductive lines, and a second logical signal is generated indicative thereof. For example, referring to FIG. 2A, current sources 206.3 and 206.4 drive the second pair of conductive lines 204.2 and 203.2, each arranged in voltage divider configuration, to generate voltages V3,V4 at respective connecting nodes 224,226. Further, high threshold monitor circuit 218 senses whether the temperature of the IC 100 is above or below the maximum temperature threshold based the voltage difference (V3−V4) and generates a logic signal 214 indicative thereof. For example, the logic signal 214 can be a logic high (e.g., "1") when the temperature is above minimum temperature threshold, and a logic low (e.g., "0") when the temperature is below the minimum temperature threshold.

At operation 510, a determination is made whether the temperature of the IC is within a normal operating range based on the first logic signal and the second logic signal, and an output signal is generated indicative thereof. For example, referring to FIG. 2A, logic gate 208 determines whether the temperature of the IC 100 is within normal operating range based on the logic signals 212 and 214, and generates the output signal 107 indicative thereof. More specifically, when both logic signals 212 and 214 are at a logic high, the logic gate 208 generates output signal 107 that is a logic high indicative of the temperature of the IC 100 being within the normal operating range. When either one of logic signal 212 or 214 is a logic low, either the minimum temperature threshold or the maximum temperature threshold has been violated, so the logic gate 208 generates output signal 107 that is a logic low indicative of the IC 100 operating at an abnormal temperature.

At operation 512, corrective action is initiated and/or preformed when it is determined, based on the output signal, that the temperature of the IC is outside the normal operating range. For example, referring to FIG. 1, controller 104 can receive the output signal 107 from the temperature sensor 108 and can control the operating status of the power supply 102 and/or the functional circuit(s) 106 based on whether the IC 100 is indicated to be operating within the normal temperature range as described above in reference to FIG. 1.

CONCLUSION

The foregoing Detailed Description discloses a temperature sensor including a low threshold monitor circuit, a high threshold monitor circuit, and a logic gate. The low threshold monitor circuit senses whether the temperature of an integrated circuit (IC) is above or below a minimum temperature threshold and generates a first logic signal indicative thereof. The low threshold monitor circuit includes a first conductive line having a first temperature coefficient of resistance (TCR) and a second conductive line having a second TCR that is different from the first TCR, where the minimum temperature threshold is determined by an intersection of the first TCR and the second TCR. The high threshold monitor circuit senses whether the temperature of the IC is above or below a maximum temperature threshold and generates a second logic signal indicative thereof. The high threshold monitor circuit includes a third conductive line having a third TCR and a fourth conductive line having a fourth TCR that is different from the third TCR, where the maximum temperature threshold is determined by an intersection of the third TCR and the fourth TCR. The logic gate determines whether the temperature of the IC is within a normal temperature range based on the first logic signal and the second logic signal, and generates an output signal indicative thereof.

The foregoing Detailed Description further discloses a method of determining whether an integrated circuit (IC) is operating within a normal temperature range. The method includes providing a first pair of conductive lines and a second pair of conductive lines. Each conductive line of the first pair has a different temperature coefficient of resistance (TCR) from the other. Likewise, each conductive line of the second pair has a different TCR from the other and has a different TCR from that of the first pair of conductive lines. The method further includes determining whether the temperature of the IC is above or below a minimum temperature threshold using the first pair of conductive lines, and generating a first logical signal indicative thereof. The method further includes determining whether the temperature of the IC is above or below a maximum temperature threshold using the second pair of conductive lines, and generating a second logical signal indicative thereof. The method further includes determining whether the temperature of the IC is within a normal operating range based on the first logic signal and the second logic signal, and generating an output signal indicative thereof. The method further includes initiating a corrective action based on the output signal indicating that the temperature of the IC is outside the normal temperature range.

The foregoing Detailed Description further discloses an integrated circuit (IC), including a power supply, a functional circuit, a temperature sensor, and a controller, all disposed on a semiconductor substrate. The power supply provides a power supply voltage or current for the IC. The functional circuit, disposed on the semiconductor provides an electrical function of the IC. The temperature sensor determines whether the temperature of the semiconductor substrate is within a normal temperature range and generates an output signal indicative thereof. The temperature sensor includes a first conductive line having a first temperature coefficient of resistance (TCR), a second conductive line having a second TCR, a third conductive line having a third TCR, and a fourth conductive line having a fourth TCR. Each of the first, second, third, fourth TCRs are different from each other. Further, an intersection of the first TCR with the second TCR determines a minimum temperature threshold of the normal temperature range an intersection of the third TCR with the fourth TCR determines a maximum temperature threshold of the normal temperature range. The controller receives the output signal from the temperature sensor and generates at least one control signal to adjust the power supply or the functional circuit based on the temperature of the semiconductor substrate being outside the normal temperature range.

The foregoing Detailed Description referred to accompanying figures to illustrate exemplary embodiments consistent with the disclosure. References in the foregoing Detailed Description to "an exemplary embodiment" indicates that the exemplary embodiment described can include a particular feature, structure, or characteristic, but every exemplary embodiment may not necessarily include the particular feature, structure, or characteristic. Moreover, such phrases are not necessarily referring to the same exemplary embodiment. Further, any feature, structure, or characteristic described in connection with an exemplary embodiment can be included, independently or in any combination, with features, structures, or characteristics of other exemplary embodiments whether or not explicitly described.

The foregoing Detailed Description is not meant to limiting. Rather, the scope of the disclosure is defined only in accordance with the following claims and their equivalents. It is to be appreciated that the foregoing Detailed Description, and not the following Abstract section, is intended to be used to interpret the claims. The Abstract section can set forth one or more, but not all exemplary embodiments, of the disclosure, and thus, is not intended to limit the disclosure and the following claims and their equivalents in any way.

The exemplary embodiments described within foregoing Detailed Description have been provided for illustrative purposes, and are not intended to be limiting. Other exemplary embodiments are possible, and modifications can be made to the exemplary embodiments while remaining within the spirit and scope of the disclosure. The foregoing Detailed Description has been described with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

Embodiments of the disclosure can be implemented in hardware, firmware, software, or any combination thereof. Embodiments of the disclosure can also be implemented as instructions stored on a machine-readable medium, which can be read and executed by one or more processors. A machine-readable medium can include any mechanism for storing or transmitting information in a form readable by a machine (e.g., a computing circuitry). For example, a machine-readable medium can include non-transitory machine-readable mediums such as read only memory (ROM); random access memory (RAM); magnetic disk storage media; optical storage media; flash memory devices; and others. As another example, the machine-readable medium can include transitory machine-readable medium such as electrical, optical, acoustical, or other forms of propagated signals (e.g., carrier waves, infrared signals, digital signals, etc.). Further, firmware, software, routines, instructions can be described herein as performing certain actions. However, it should be appreciated that such descriptions are merely for convenience and that such actions in fact result from computing devices, processors, controllers, or other devices executing the firmware, software, routines, instructions, etc.

The foregoing Detailed Description fully revealed the general nature of the disclosure that others can, by applying knowledge of those skilled in relevant art(s), readily modify and/or adapt for various applications such exemplary embodiments, without undue experimentation, without departing from the spirit and scope of the disclosure. Therefore, such adaptations and modifications are intended to be within the meaning and number of equivalents of the exemplary embodiments based upon the teaching and guidance presented herein. It is to be understood that the phraseology or terminology herein is for the purpose of description and not of limitation, such that the terminology or phraseology of the present specification is to be interpreted by those skilled in relevant art(s) in light of the teachings herein.

What is claimed is:

1. A temperature sensor, comprising:

a low threshold monitor circuit configured to sense whether the temperature of an integrated circuit (IC) is above or below a minimum temperature threshold and generate a first logic signal indicative thereof, the low threshold monitor circuit including:

a first conductive line having a first temperature coefficient of resistance (TCR), the first TCR determined by a first width of the first conductive line; and a second conductive line having a second TCR that is different from the first TCR, the second TCR determined by a second width of the second conductive line, wherein the minimum temperature threshold is determined by an intersection of the first TCR and the second TCR;

a high threshold monitor circuit configured to sense whether the temperature of the IC is above or below a maximum temperature threshold and generate a second logic signal indicative thereof, the high threshold monitor circuit including:

a third conductive line having a third TCR, the third TCR determined by a third width of the third conductive line that is different from the first width and the second width; and a fourth conductive line having a fourth TCR that is different from the third TCR, wherein the maximum temperature threshold is determined by an intersection of the third TCR and the fourth TCR; and a logic gate configured to determine whether the temperature of the IC is within a normal temperature range based on the first logic signal and the second logic signal, and generate an output signal indicative thereof.

2. The temperature sensor of claim 1, wherein:

the first TCR is more sensitive to temperature than the second TCR so that a resistance of the first conductive line increases faster with temperature than a resistance of the second conductive line to cause the intersection of the first TCR and the second TCR at the minimum temperature threshold; and the third TCR is more sensitive to temperature than the fourth TCR so that a resistance of the third conductive line increases faster with temperature than a resistance of the fourth conductive line to cause the intersection of the third TCR and the fourth TCR at the maximum temperature threshold.

3. The temperature sensor of claim 2, wherein:

the first width is greater than the second width of the second conductive line; and the third width is greater than the fourth width of the fourth conductive line.

4. The temperature sensor of claim 1, wherein the logic gate is further configured to generate the output signal having a first logic state based on:

the first logic signal indicating that the temperature of the IC is above the minimum temperature threshold; and the second logic signal indicating that the temperature of the IC is below the maximum temperature threshold.

5. The temperature sensor of claim 4, wherein the logic gate is further configured to generate the output signal having a second logic state based on:

the first logic signal indicating that the temperature of the IC is below the minimum temperature threshold; or the second logic signal indicating that the temperature of the IC is above the maximum temperature threshold.

6. The temperature sensor of claim 1, wherein the logic gate is further configured to:

generate the output signal having a first logic state based on the first logic signal and the second logic signal having the first logic state; and generate the output signal having a second logic state based on either the first logic signal or the second logic signal having a second logic state.

7. The temperature sensor of claim 1, wherein the low threshold monitor circuit further includes:

a first constant current source configured to drive the first conductive line with a constant current, to generate a voltage V1 at a first node connected to the first conductive line;

a second constant current source configured to drive the second conductive line with the constant current, to generate a voltage V2 at a second node connected to the second conductive line; and an operational amplifier configured to measure a voltage difference (V1−V2) and output the first logic signal as a first logic state when V1 is greater than V2, and output the first logic signal as a second logic state when V2 is greater than V1, wherein the voltage difference (V1−V2) is representative of whether the temperature of the IC is above or below the minimum temperature threshold.

8. The temperature sensor of claim 7, wherein the high threshold monitor circuit further includes:

a third constant current source configured to drive the third conductive line with the constant current, to generate a voltage V3 at a third node connected to the third conductive line;

a fourth constant current source configured to drive the fourth conductive line with the constant current, to generate a voltage V4 at a fourth node connected to the fourth conductive line; and an operational amplifier configured to measure a voltage difference (V3−V4) and output the second logic signal as the first logic state when V3 is greater than V4, and output the second logic signal as the second logic state when V4 is greater than V3, wherein the voltage difference (V3−V4) is representative of whether the temperature of the IC is above or below the maximum temperature threshold.

9. The temperature sensor of claim 8, wherein:

the first conductive line is arranged in a first voltage divider driven by the first constant current source to generate the voltage V1;

the second conductive line is arranged in a second voltage divider driven by the second constant current source to generate the voltage V2;

the third conductive line is arranged in a third voltage divider driven by the third constant current source to generate the voltage V3; and the fourth conductive line is arranged in a fourth voltage divider driven by the fourth constant current source to generate the voltage V4.

10. A method of determining whether an integrated circuit (IC) is operating within a normal temperature range, comprising:

providing a first pair of conductive lines, each conductive line of the first pair having a different temperature coefficient of resistance (TCR) from the other;

providing a second pair of conductive lines, each conductive line of the second pair having a different TCR from the other and having a different TCR from that of the first pair of conductive lines;

determining whether the temperature of the IC is above or below a minimum temperature threshold using the first pair of conductive lines, and generating a first logical signal indicative thereof;

determining whether the temperature of the IC is above or below a maximum temperature threshold using the second pair of conductive lines, and generating a second logical signal indicative thereof;

determining whether the temperature of the IC is within a normal operating range based on the first logic signal and the second logic signal, and generating an output signal indicative thereof; and initiating a corrective action based on the output signal indicating that the temperature of the IC is outside the normal temperature range, wherein the first pair of conductive lines include a first conductive line having a first width corresponding to a first TCR and a second conductive line having a second width corresponding to a second TCR, and wherein the second pair of conductive lines include a third conductive line having a third width corresponding to a third TCR, the third width different from the first width and the second width, and wherein the second pair of conductive lines further include a fourth conductive line having a fourth width corresponding to a fourth TCR.

11. The method of claim 10, wherein the first TCR is more sensitive to temperature than the second TCR so that a resistance of a first conductive line increases faster with temperature than a resistance of the second conductive line to cause an intersection of the first TCR and the second TCR at the minimum temperature threshold.

12. The method of claim 11, wherein the third TCR is more sensitive to temperature than the fourth TCR so that a resistance of a third conductive line increases faster with temperature than a resistance of the fourth conductive line to cause an intersection of the third TCR and the fourth TCR at the maximum temperature threshold.

13. The method of claim 12, wherein:

the first width is greater than the second width of the second conductive line; and the third width is greater than the fourth width of the fourth conductive line.

14. The method of claim 10, wherein the corrective action includes:

adjusting a supply voltage or current provided by a power supply of the IC;

adjusting a processing speed of a functional circuit of the IC; or disabling a signal output or data output of the functional circuit.

15. The method of claim 10, wherein generating the output signal includes:

generating the output signal having a first logic state based on the first logic signal and the second logic signal having the first logic state; and generating the output signal having a second logic state based on either the first logic signal or the second logic signal having the second logic state.

16. An integrated circuit (IC), comprising:

a semiconductor substrate;

a power supply, disposed on the semiconductor substrate, configured to provide a power supply voltage or current for the IC;

a functional circuit, disposed on the semiconductor substrate, configured to provide an electrical function of the IC;

a temperature sensor, disposed on the semiconductor substrate, configured to determine whether the temperature of the semiconductor substrate is within a normal temperature range and generate an output signal indicative thereof, the temperature sensor including:

a first conductive line having a first temperature coefficient of resistance (TCR) determined by a first width of the first conductive line;

a second conductive line having a second TCR determined by a second width of the second conductive line;

a third conductive line having a third TCR determined by a third width of the third conductive line that is different from the first width and the second width; and a fourth conductive line having a fourth TCR determined by a fourth width of the fourth conductive line, wherein each of the first, second, third, and fourth TCRs are different from each other, wherein an intersection of the first TCR with the second TCR determines a minimum temperature threshold of the normal temperature range, and wherein an intersection of the third TCR with the fourth TCR determines a maximum temperature threshold of the normal temperature range, and a controller configured to receive the output signal and generate at least one control signal to adjust the power supply or the functional circuit based on the temperature of the semiconductor substrate being outside the normal temperature range.

17. The IC of claim 16, wherein:

the first TCR is more sensitive to temperature than the second TCR so that a resistance of the first conductive line increases faster with temperature than a resistance of the second conductive line to cause the intersection of the first TCR and the second TCR at the minimum temperature threshold; and the third TCR is more sensitive to temperature than the fourth TCR so that a resistance of the third conductive line increases faster with temperature than a resistance of the fourth conductive line to cause the intersection of the third TCR and the fourth TCR at the maximum temperature threshold.

18. The IC of claim 16, wherein the at least one control signal includes:

a first control signal configured to adjust the power supply voltage or the current provided by the power supply; or a second control signal configured to disable a signal output or a data output of the functional circuit.

19. The IC of claim 16, wherein:

the first conductive line is arranged in a first voltage divider driven by the first constant current source to generate a voltage V1;

the second conductive line is arranged in a second voltage divider driven by the second constant current source to generate a voltage V2;

the third conductive line is arranged in a third voltage divider driven by the third constant current source to generate a voltage V3; and the fourth conductive line is arranged in a fourth voltage divider driven by the fourth constant current source to generate a voltage V4.

20. The IC of claim 19, wherein the temperature sensor further comprises a logic gate configured to:

determine whether the temperature of the IC is above or below the minimum temperature threshold based on a comparison of voltages V1 and V2 and determine whether the temperature is above or below the maximum temperature threshold based on a comparison of voltages V3 and V4;

generate the output signal to have a first logic state when the temperature of the IC is above the minimum temperature threshold and below the maximum temperature threshold; and generate the output signal to have a second logic state when the temperature of the IC is below the minimum temperature threshold or above the maximum temperature threshold.

* * * * *